(No Model.)
J. S. BROWN.
FLOWER POT TRELLIS.
No. 425,745. Patented Apr. 15, 1890.
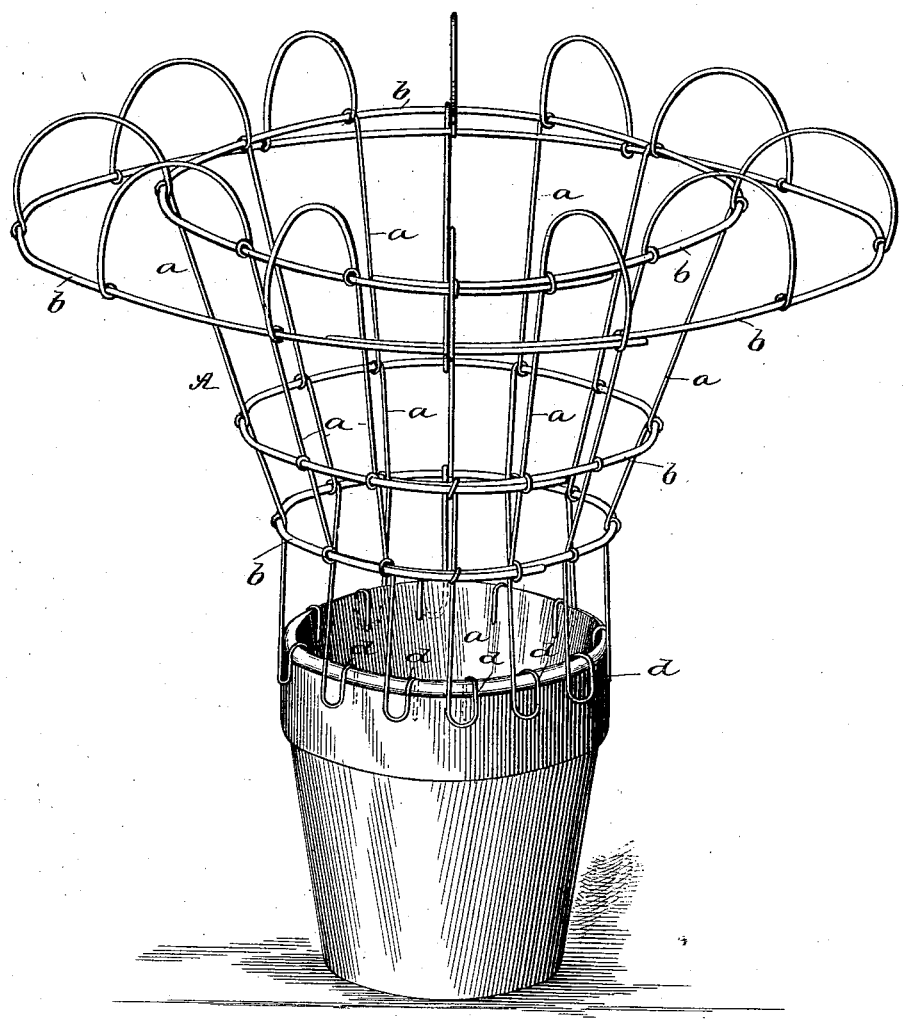
WITNESSES:
Fred G. Dieterich
Edw. W. Byrn.
INVENTOR:
J. S. Brown.
BY Munn & Co
ATTORNEYS

UNITED STATES PATENT OFFICE.

JOHN STODDART BROWN, OF GALVESTON, TEXAS.

FLOWER-POT TRELLIS.

SPECIFICATION forming part of Letters Patent No. 425,745, dated April 15, 1890.

Application filed November 26, 1889. Serial No. 331,703. (No model.)

*To all whom it may concern:*

Be it known that I, JOHN STODDART BROWN, of Galveston, in the county of Galveston and State of Texas, have invented a new and useful Improvement in Flower-Pot Trellis, of which the following is a specification.

My invention is in the nature of an improved adjustable flower-pot trellis adapted to be applied to flower-pots of various sizes to support plants or vines without interfering with their roots.

It consists of a vase-shaped skeleton frame of wire consisting of vertical rods bent to give shape to the trellis, and formed at their lower ends into hooks or clasps that embrace the rim of the pot, combined with circular extensible hoops or wire rings, which may be enlarged or reduced in size to admit the lower end of the trellis to the circumference of the pot to which it is to be applied.

The figure is a perspective view of the trellis applied to a flower-pot.

A is the wire trellis, which is of an upwardly-diverging vase-shaped contour. It is composed of the vertical rods or wires *a* and the horizontal extensible hoops or rings *b*. The vertical wires are bent so as to give the desired configuration to the trellis, and the said vertical wires are connected to the horizontal rings or hoops *b* by means of a loop, wrap, or convolution of the wire of the vertical member, through which wrap the horizontal ring extends. The lower ends of the vertical wires are formed with return-bends *d*, to constitute clasps that embrace the rim of the pot and hold the trellis thereon by frictional contact. The horizontal rings are not of a fixed size, but have their disconnected ends extended past each other, so as to permit these rings to be enlarged or reduced in size to adapt the trellis to different-sized pots, the connection of the vertical wires to the horizontal rings being such as to permit the rings to slip freely through the loops or wraps, so as to adjust the spacings between the vertical wires to suit the increased or diminished size of the horizontal rings.

This device is cheaply made, is applicable to all sorts and sizes of flower-pots, makes a graceful trellis, and does not interfere with the roots of the plants.

Having thus described my invention, what I claim as new is—

1. A skeleton-framed wire trellis for flower-pots, consisting of vertical wires having the loops and horizontal wires bent into the form of rings with lapped and adjustable ends to increase or diminish the size of the trellis, as described.

2. A skeleton-framed wire trellis for flower-pots, consisting of vertical wires bent to form loops or wraps for connecting with the horizontal wires, and bent into clasps at their lower ends, combined with the horizontal wires bent into ring shape and extending through the loops of the vertical wire, and having their ends lapped past each other for adjustability, substantially as shown and described.

JOHN STODDART BROWN.

Witnesses:
J. W. PAYNE,
W. E. BLANTON.